United States Patent

[11] 3,557,940

| | | |
|---|---|---|
| [72] | Inventors | Harry T. Rogers<br>New Haven;<br>James H. Rogers, Louisville, Ky. |
| [21] | Appl. No. | 766,923 |
| [22] | Filed | Oct. 11, 1968 |
| [45] | Patented | Jan. 26, 1971 |
| [73] | Assignee | Mac Manufacturing Company Inc.<br>Lebanon Junction, Ky.<br>a corporation of Kentucky |

[54] BARREL ELEVATOR
6 Claims, 8 Drawing Figs.

[52] U.S. Cl.................................................. 198/157,
214/16.4
[51] Int. Cl..................................................... B65g 1/04,
B65g 47/34
[50] Field of Search........................................... 214/16B,
16.4; 198/154, 156, 157, 158

[56] References Cited
UNITED STATES PATENTS

| 665,022 | 1/1901 | Levalley........................ | 198/156 |
|---|---|---|---|
| 746,247 | 12/1903 | Baggaley...................... | (214/16.4)UX |
| 2,726,753 | 12/1955 | Bee............................... | 214/16(B)X |
| 1,829,317 | 10/1931 | Waechter...................... | 198/157 |

*Primary Examiner*—Robert G. Sheridan
*Attorney*—William R. Price

ABSTRACT: Discloses a barrel elevator, including a vertically oriented endless conveyor trained over an upper and lower sprocket and containing a series of cradles suspended therefrom in which the barrels are loaded on the ascending side of said conveyor and unloaded on the descending side of said conveyor. Discloses means and methods for automatically and gravitationally unloading barrels at a preselected level by means of an inclined unloading member extending from an unloading station to a point past the perpendicular through the center of gravity of the barrel lying on its side in said cradle so as to separate the barrel from the cradle and gravitationally roll said barrel down the inclined member. Guide rods, vertically disposed behind the swinging cradles, prevent barrels from tipping out of the cradles to fall down into the shaft.

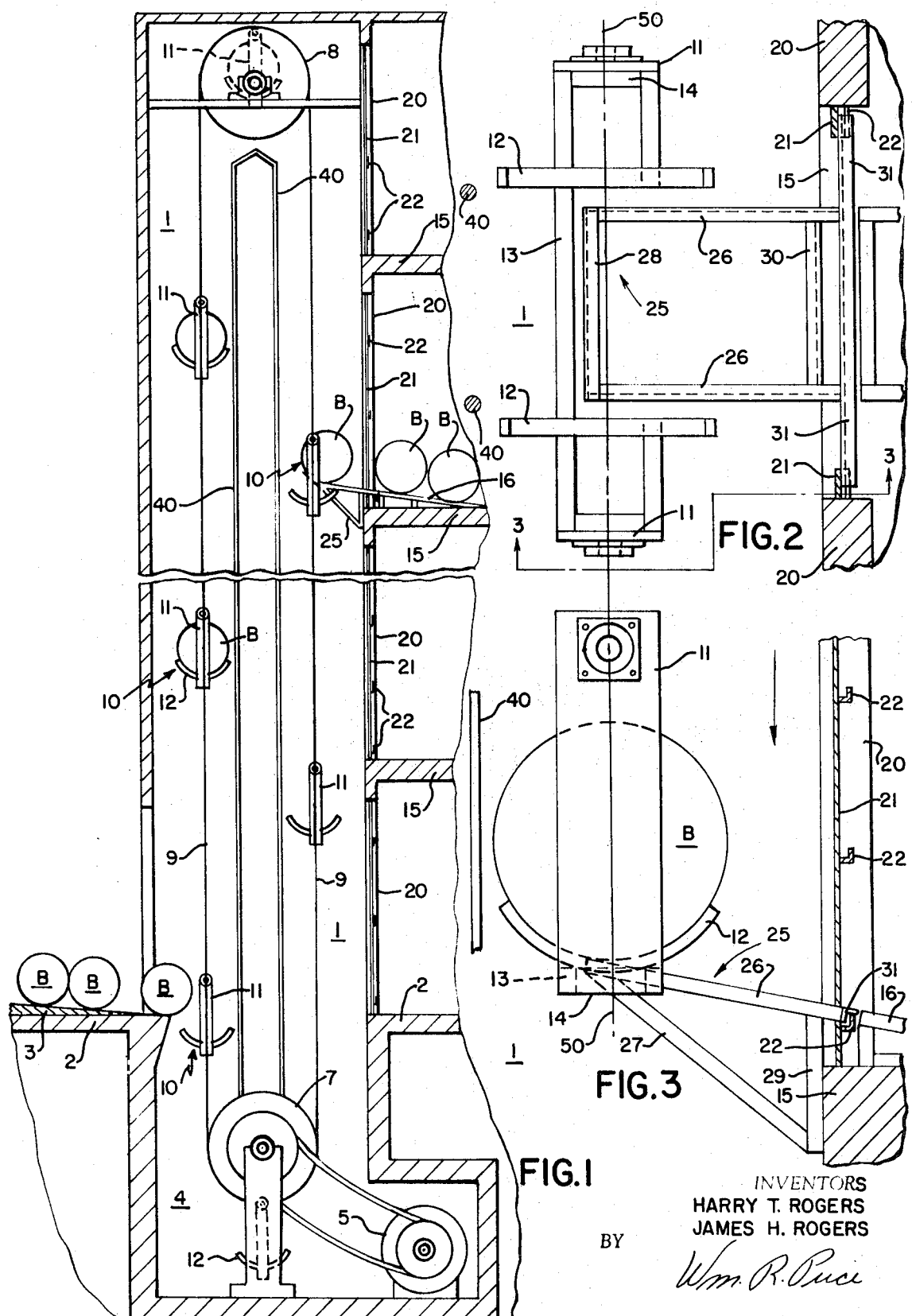

PATENTED JAN26 1971

INVENTORS.
HARRY T. ROGERS
JAMES H. ROGERS
BY
Wm. R. Price
ATTORNEY 3,557,940

BARREL ELEVATOR

FIELD OF THE INVENTION

This invention relates to material handling apparatus and particularly to apparatus for elevating and delivering barrels from one level to another. More specifically, this invention relates to an elevator system for barrels containing cradles freely suspended from a vertically oriented endless conveyor in which the barrels are loaded on the ascending side of said conveyor and unloaded on the descending side of said conveyor. More specifically, this invention relates to improvements in selectively unloading barrels gravitationally and automatically from the cradles.

DESCRIPTION OF THE PRIOR ART

Cradle or tray elevators are well known in the art, having been disclosed in U.S. Pat. No. 1,829,317 to Waechter which patent was assigned to the Link Belt Company. Such elevators, insofar as they have been utilized for handling barrels in whiskey warehousing operations, have been quite successful except for the initial cost. The Waechter-type elevator utilized a series of fingers supported on rotatable shafts at each floor of the warehouse. One set of fingers projects from the unloading station toward the cradle and the other set of fingers projects from the middle of the elevator shaft toward the cradle so that the two sets are in alignment to pick up the barrel as the cradle moves vertically downwardly and gravitationally discharges the barrel onto the aligned fingers and from there to the unloading ramp.

This meant, of course, that it was necessary to build a superstructure at each floor for supporting said shafts containing the fingers and to utilize some means to place the fingers in inoperative or operative position so as to either allow the barrels to pass or to engage the barrel and unload it at a specified level. Due to this expense, some elevators were utilized without the superstructure in which the cradle would stop at a specified level (generally while being loaded at the loading station) and a man at this floor would roll the barrel from the cradle to the unloading ramp. However, this practice was extremely dangerous in that a man could be injured or either he or the barrel could fall down the elevator shaft.

SUMMARY OF THE INVENTION

According to my invention, barrels may be unloaded automatically and gravitationally at preselected levels through the use of an unloading member inclined toward the unloading station which projects into the path of the barrel in its descent and engages the lower surface of the side of the barrel past the perpendicular through the center of gravity of the barrel on its side on the cradle vertically disposed guide rods, behind the cradle, prevent the cradle from tipping and the barrel from falling down the elevator shaft.

The cradle consists of at least two curved barrel receiving arms connected together by a transverse connecting bar offset past the perpendicular to the center of gravity of the barrel so as to be out of contact with the inclined unloading member projecting from the door of the elevator into the elevator shaft.

Additionally, means are provided whereby the unloading member may be moved vertically and secured at different levels at a particular station or from station to station so as to automatically unload the barrels at a preselected level.

BRIEF DESCRIPTION OF THE DRAWINGS

Referring now to the drawings which illustrate the invention:

FIG. 1 is a vertical section, with parts in elevation of an elevator shaft the overall operation of the elevator.

FIG. 2 is a more or less diagrammatic plan view illustrating the relation of the unloading member to the cradle and to the vertically disposed guide rails in the middle of the shaft.

FIG. 3 is a more or less diagrammatical view in section with parts in elevation illustrating again the relationship of the unloading member to the cradle and of the cradle to the vertically dispose guide rails.

DESCRIPTION OF THE PREFERRED EMBODIMENT

Figure 4:
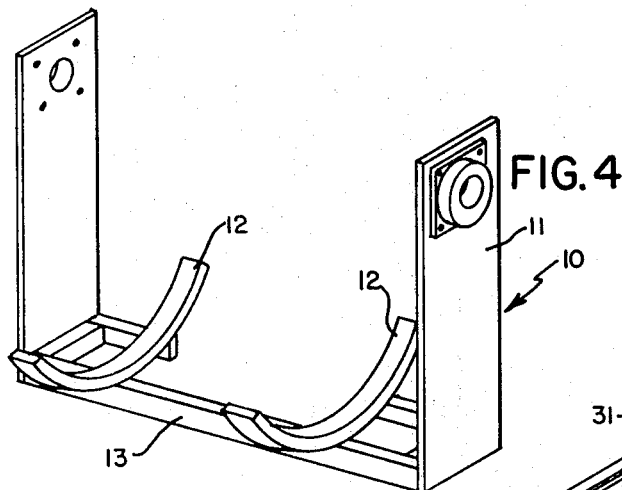
FIG. 4 is a view in perspective of the cradle of this invention.

In whiskey warehousing operations, it has been the practice in the past to utilize a warehouse comprising several individual floors. Each floor contains two to three rows of barrel-receiving racks or dunnage. At the end of the warehouse, is located an elevator shaft in which a tray or cradle-type elevator is situated. This consists of an endless conveyor trained over upper and lower sprockets, including a series of trays or cradles vertically suspended from said conveyor by hanger members. Thus, the barrels are loaded into the warehouse on the ascending side of the elevator and unloaded on the descending side of the elevator. At this point, the barrels of whiskey are rolled to one of several levels of barrel-receiving racks and the barrels then remain in said racks for for a period of four years or more.

Referring now to the drawings, the elevator shaft 1 is generally built at the end of the warehouse so that barrels are loaded onto the cradles 10 from the ground floor 2 to loading ram 3. Below the ground floor is a pit 4 containing a gear motor and brake 5, operatively connected to lower sprocket 7. Trained over lower sprocket 7 and upper sprocket 8 is a chain 9 made up of flat link elements of the Link Belt type. Vertically suspended from the chain 9 are a series of cradles 10 suspended from the chain by means of hanger arms 11. The cradles consist of at least two curved cradle arms 12 joined together by a transverse bar 13 connected to the hanger members by connecting piece 14 from the hanger 11. Behind the swinging cradles 10, are vertically disposed guide rods 40, which extend for essentially the full length of the elevator shaft 1. Guide rods 40, prevent barrels from tipping out of the cradles 10 and falling down the shaft. As will be noted by examination of FIGS. 2 and 3, the transverse connecting bar 13 is offset from the vertical centerline of the cradle and of the barrels on the cradle, which is designed as the center of gravity 50. This allows the unloading member 25 to extend from the door 20 of an upper floor 15 into the elevator shaft 1 between the curved cradle arms 12 past the center of gravity 50 and yet avoid rubbing contact with the transverse bar 13. Thus, as is illustrated in FIG. 3, as a barrel descends on the unloading side of the elevator, the lower surface of the side of the barrel comes into contact with the track members 26 of the unloading member 25 at a point past the perpendicular through the center of gravity 50 of said barrel. As the cradle 10 descends, the barrel B is separated therefrom and it is gravitationally discharged down the track members 26 of the unloading members 25 to unloading ramp 16. Guide rods 40 prevent the barrel from tipping out of the cradle 10 and falling down into the shaft 1. The opening or door from the upper floor 15 of the warehouse to the shaft 1 of the elevator is designated by numeral 20. As is illustrated here, according to this invention there is an anchoring means in the form of a lug 22, attached to the side of the door 20 at various levels. A vertically disposed metal bar 21 attached to the side of the door 20 in front of lug 22 assists in securing the unloading member 25.

Figure 5:
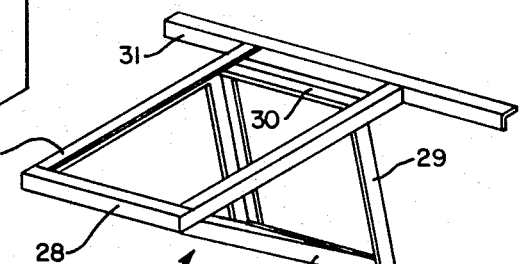
FIG. 5 is a view in perspective of the unloading member of this invention.
Figure 6:
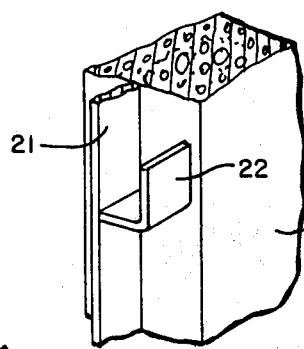
FIG. 6 is an enlarged perspective view illustrating the lug located on the side of the door of the elevator shaft for supporting said unloading member.
Figure 7:
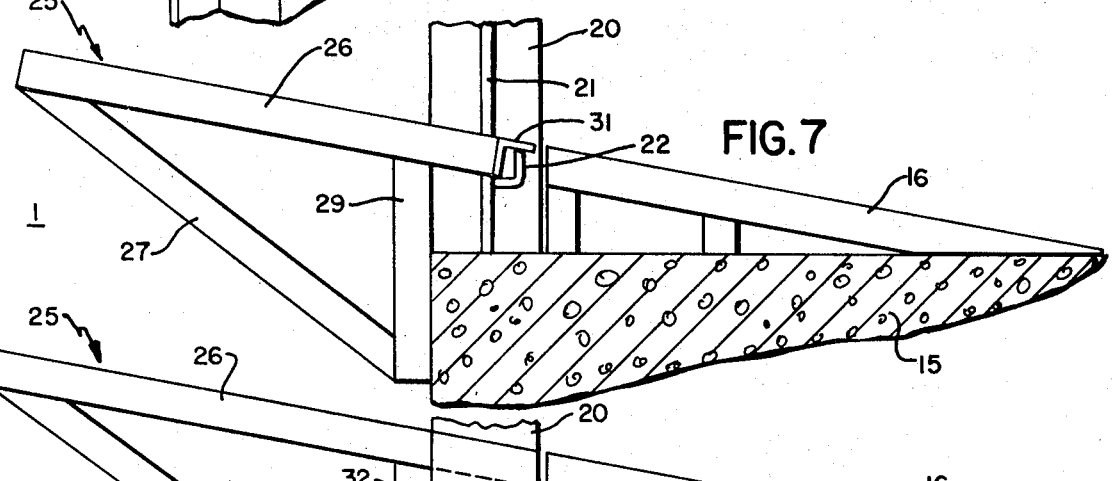
FIG. 7 is a sectional view, with parts in elevation, taken along lines 7-7 of FIG. 2 illustrating the relationship of the transverse bar of said unloading member to said lug.
Figure 8:
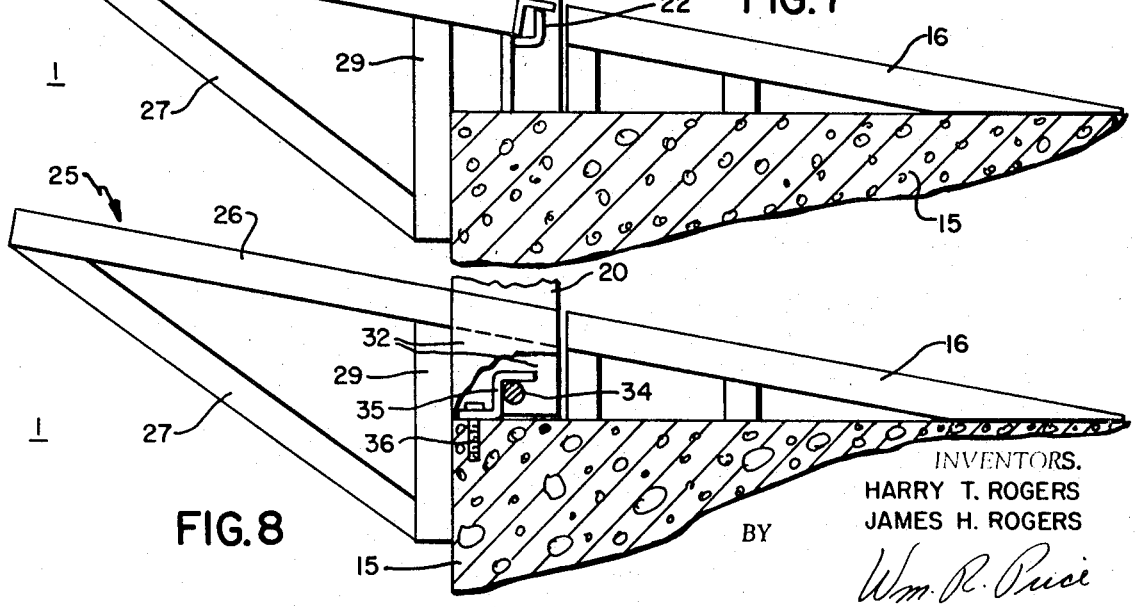
FIG. 8 is a view of a modification of the support and connecting means for said unloading member.

The lug 22 is for anchoring the unloading member 25 into position so that the track members 26 extend into the elevator 1 shaft and into the descending path of the barrels B so as to contact the bottom surface of the barrel past the perpendicular to the center of gravity 50 so that the barrel B rolls down the track members 26 onto the unloading ramp 16. The unloading member 25 consists of inclined angle irons 26 which act as tracks and which join a transverse member 28 at the tip of the member 25. Welded to the transverse member 28 and the two angle irons 26 are two diagonally disposed support members 27 which in turn are welded to upright members 29 resting against the exterior surface of the bottom of the door inside of the shaft 1. Connected to the two vertical upright pieces 29 as by welding is a transverse member 30, which in turn, is connected on the lower surface of each of the track members 26. At the end of the two track members 26 is another transverse member 31, welded to their lower surface so as to be in abutting relationship with the end of ramp 16. Transverse member 31 is an angle iron which extends the width of door 20 (as illustrated in FIG. 5) so that the depending flange fits between lug 22 and vertical metal bar 21 (as illustrated in FIGS. 6 and 7). A modification of the anchoring means is illustrated in FIG. 8. In this modification a plate 32 is welded to members 26, 29, 30 and 31, and thereafter a pintle 34 is welded to plate 32. Pintle 34 engages with lug 35 attached by bolt 36 to floor 15 at the bottom of the door 20.

With this modification, it is not possible to locate the lug 35 at a higher level as is possible with lug 22. As is illustrated in FIGS. 1 and 3, lug 22 may be located at a higher level to allow the barrels to be rolled onto skids supported by trusses at a level equal to the upper racks or dunnage.

It would be appreciated that this invention is specifically directed to the handling of barrels in whiskey warehousing operations. Nevertheless, in the claims, the term cylindrical member has been utilized since the invention is equally applicable to drums, to rows of paper or to coils of steel and the like.

As many embodiments will occur to those skilled in the art from the detailed description hereinabove given, said description is intended to be exemplary in nature and nonlimiting except so as to be commensurate in scope with the appended claims.

We claim:

1. An elevator system, including a vertically oriented endless conveyor, a series of load-bearing cradles suspended therefrom and a series of vertically separated unloading stations associated therewith:
   A. each of said load-bearing cradles comprising two curved load-receiving arms for receiving and supporting a cylindrical member on its side and a transverse connecting bar connected to said load receiving arms,
      1. said transverse connecting bar being offset at its point of connection past the perpendicular through the center of gravity of said cylindrical member on said load-bearing cradle;
   B. an unloading member, extending from said unloading station into the path of said load-bearing cradles, but out of contact with said receiving arms, past the perpendicular through said center of gravity, but short of rubbing contact with said transverse connecting bar,
      1. said unloading member being inclined toward said unloading station, so as to contact the bottom surface of the side of said cylindrical member, to separate said cylindrical member from said cradle, and to gravitationally discharge said cylindrical member down said inclined unloading member to said unloading station; and
   C. the further combination therewith of a vertically oriented guide rod mounted behind said free swinging load bearing cradles and acting to prevent tipping of cylindrical members out of said cradles.

2. An elevator system, as defined in claim 1, in which said unloading member is vertically movable so as to selectively unload said cradles at a specified vertical level.

3. An elevator system, as defined in claim 1, in which said unloading member is vertically moveable from one unloading station to another so as to selectively unload said cradles at a specified station.

4. An elevator system, as defined in claim 1, the further combination therewith of anchoring means for said unloading member whereby said unloading member may be detachably anchored at a selected level of said unloading station.

5. An elevator system, as defined in claim 1, in which said unloading member extends between said receiving arms of said cradle.

6. For use with an inclined unloading member, extending from an unloading station to the downward path of travel of a cylindrical member supported on its side on the unloading side of an elevator system:
   A. the improvement comprising a load bearing cradle suspended from a vertically oriented endless conveyor which includes:
      1. at least two curved load-receiving arms for receiving and supporting a cylindrical member on its side; and,
      2. a transverse connecting bar connected to said receiving arms at a point past the perpendicular through the center of gravity of said cylindrical member; and
   B. the further combination therewith of a vertically oriented guide rod mounted behind said load-bearing cradle and acting to prevent tipping of a cylindrical member out of said cradle.